US008537638B2

(12) United States Patent
Lee et al.

(10) Patent No.: US 8,537,638 B2
(45) Date of Patent: Sep. 17, 2013

(54) METHODS FOR SUBSURFACE PARAMETER ESTIMATION IN FULL WAVEFIELD INVERSION AND REVERSE-TIME MIGRATION

(75) Inventors: Sunwoong Lee, Houston, TX (US);
Jerome R. Krebs, Houston, TX (US);
John E. Anderson, Houston, TX (US);
Anatoly Baumstein, Houston, TX (US);
David L. Hinkley, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 505 days.

(21) Appl. No.: 12/984,412

(22) Filed: Jan. 4, 2011

(65) Prior Publication Data
US 2011/0194379 A1    Aug. 11, 2011

Related U.S. Application Data

(60) Provisional application No. 61/303,148, filed on Feb. 10, 2010.

(51) Int. Cl.
*G01V 1/00* (2006.01)
*G01V 1/28* (2006.01)
(52) U.S. Cl.
CPC ... *G01V 1/00* (2013.01); *G01V 1/28* (2013.01);
*G01V 1/282* (2013.01);
*G01V 2210/663* (2013.01)
USPC .......................................................... 367/73
(58) Field of Classification Search
USPC .................................................... 367/38, 73
See application file for complete search history.

(56) References Cited

U.S. PATENT DOCUMENTS

| 3,812,457 A | 5/1974 | Weller |
| 3,864,667 A | 2/1975 | Bahjat |
| 4,159,463 A | 6/1979 | Silverman |
| 4,168,485 A | 9/1979 | Payton et al. |

(Continued)

FOREIGN PATENT DOCUMENTS

| EP | 1 094 338 | 4/2001 |
| EP | 1 746 443 | 1/2007 |

(Continued)

OTHER PUBLICATIONS

Akerberg, P., et al. (2008), "Simultaneous source separation by sparse radon transform," 78th SEG Annual International Meeting, *Expanded Abstracts*, pp. 2801-2805.

(Continued)

*Primary Examiner* — Krystine Breier
(74) *Attorney, Agent, or Firm* — ExxonMobil Upstream Research Company Law Dept.

(57) ABSTRACT

Method for converting seismic data to obtain a subsurface model of, for example, bulk modulus or density. The gradient of an objective function is computed (103) using the seismic data (101) and a background subsurface medium model (102). The source and receiver illuminations are computed in the background model (104). The seismic resolution volume is computed using the velocities of the background model (105). The gradient is converted into the difference subsurface model parameters (106) using the source and receiver illumination, seismic resolution volume, and the background subsurface model. These same factors may be used to compensate seismic data migrated by reverse time migration, which can then be related to a subsurface bulk modulus model. For iterative inversion, the difference subsurface model parameters (106) are used as preconditioned gradients (107).

21 Claims, 7 Drawing Sheets

(56) References Cited

U.S. PATENT DOCUMENTS

| | | |
|---|---|---|
| 4,545,039 A | 10/1985 | Savit |
| 4,562,540 A | 12/1985 | Devaney |
| 4,575,830 A | 3/1986 | Ingram et al. |
| 4,594,662 A | 6/1986 | Devaney |
| 4,636,956 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,828 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,646,924 B2 | 1/2010 | Donoho |
| 7,672,194 B2 | 3/2010 | Jeffryes |
| 7,675,815 B2 * | 3/2010 | Saenger et al. ............... 367/38 |
| 7,679,990 B2 | 3/2010 | Herkenhoff et al. |
| 7,715,985 B2 | 5/2010 | Van Manen et al. |
| 7,725,266 B2 | 5/2010 | Sirgue et al. |
| 7,835,072 B2 | 11/2010 | Izumi |
| 7,840,625 B2 | 11/2010 | Candes et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2005/0088913 A1 | 4/2005 | Lecomte |
| 2006/0155475 A1 | 7/2006 | Yin |
| 2006/0235666 A1 | 10/2006 | Assa et al. |
| 2007/0036030 A1 | 2/2007 | Baumel et al. |
| 2007/0255500 A1 | 11/2007 | Pita et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0070042 A1 | 3/2009 | Birchwood et al. |
| 2009/0083006 A1 | 3/2009 | Mackie |
| 2009/0164186 A1 * | 6/2009 | Haase et al. ............... 703/10 |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0142316 A1 | 6/2010 | Keers et al. |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |

OTHER PUBLICATIONS

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Anderson, J.E. et al. (2008), "Sources Near the Free-Surface Boundary: Pitfalls for Elastic Finite-Difference Seismic Simulation and Multi-Grid Waveform Inversion," 70th EAGE Conf. & Exh., 4 pgs.

Beasley, C. (2008), "A new look at marine simultaneous sources," *The Leading Edge* 27(7), pp. 914-917.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Ben-Hadj-Ali, H. et al. (2009), "Three-dimensional frequency-domain full waveform inversion with phase encoding," *SEG Expanded Abstracts*, pp. 2288-2292.

Beylkin, G. (1985), "Imaging of discontinuities in the inverse scattring problem by inversion of a causal generalized Radon transform," *J. Math. Phys.* 26, pp. 99-108.

Bonomi, E. et al. (2006), "Wavefield Migration plus Monte Carlo Imaging of 3D Prestack Seismic Data," *Geophysical Prospecting* 54, pp. 505-514.

Bunks, C., et al. (1995), "Multiscale seismic waveform inversion," *Geophysics* 60, pp. 1457-1473.

Chavent, G. et al. (1999), "An optimal true-amplitude least-squares prestack depth-migration operator," *Geophysics* 64(2), pp. 508-515.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

Gibson, B. et al. (1984), "Predictive deconvolution and the zero-phase source," *Geophysics* 49(4), pp. 379-397.

Griewank, A. (1992), "Achieving logarithmic growth of temporal and spatial complexity in reverse automatic differentiation," *Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Helbig, K. (1994), "Foundations of Anisotropy for Exploration Seismics," Chapter 5, pp. 185-194.

Hu, L.Z. et al. (1987), "Wave-field transformations of vertical seismic profiles," *Geophysics* 52, pp. 307-321.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J Acoust. Soc. Am.* 89(1), pp. 171-181.

Liu, F. et al. (2007), "Reverse-time migration using one-way wavefield imaging condition," *SEG Expanded Abstracts* 26, pp. 2170-2174.

Maharramov, M. et al. (2007), "Localized image-difference wave-equation tomography," SEG Annual Meeting, *Expanded Abstracts*, pp. 3009-3013.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Pratt, R.G. et al. (1998), "Gauss-Newton and full Newton methods in frequency-space seismic waveform inversion," *Geophys. J. Int.* 133, pp. 341-362.

Sheng, J. et al. (2006), "Early arrival waveform tomography on near-surface refraction data," *Geophysics* 71, pp. U47-U57.

Simard, P.Y. et al. (1990), "Vector Field Restoration by the Method of Convex Projections," *Computer Vision, Graphics and Image Processing* 52, pp. 360-385.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Tsvankin, I. (2001), "Seismic Signatures and Analysis of Reflection Data in Anisotropic Media," Elsevier Science, p. 8.

Xie, X. et al. (2002), "Extracting angle domain information from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yoon, K. et al. (2004), "Challenges in reverse-time migration," *SEG Expanded Abstracts* 23, pp. 1057-1060.

Abt, D.L. et al. (2010), "North American lithospheric discontinuity structured imaged by Ps and Sp receiver functions", *J. Geophys. Res.*, 24 pgs.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," Geophysics 70(1), pp. R1-R14.

Dunkin, J.W. et al. (1973), "Effect of Normal Moveout on a Seismic Pluse," *Geophysics* 38(4), pp. 635-642.

Igel, H. et al. (1996), "Waveform inversion of marine reflection seismograms for P impedance and Poisson's ratio," *Geophys. J. Int.* 124i, pp. 363-371.

Lancaster, S. et al. (2000), "Fast-track 'colored' inversion," 70th SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Moghaddam. P.P. et al. (2010, "Randomized full-waveform inversion: a dimensionality-reduction approach," 80th SEG Ann Meeting, *Expanded Abstracts*, pp. 977-982.

Ostmo, S. et al. (2002), "Finite-difference iterative migration by linearized waveform inversion in the frequency domain," SEG Int'l. Expo. & 72nd Ann. Meeting, 4 pgs.

Pica, A. et al. (2005), "3D Surface-Related Multiple Modeling, Principles and Results," 2005 SEG Ann. Meeting, *SEG Expanded Abstracts* 24, pp. 2080-2083.

Rawlinson, N. et al. (2008), "A dynamic objective function technique for generating multiple solution models in seismic tomography," *Geophys. J. Int.* 178, pp. 295-308.

Shen, P. et al. (2003), "Differential semblance velocity analysis by wave-equation migration," 73rd Ann. Meeting of Society of Exploration Geophysicists, 4 pgs.

Shih, R-C. et al. (1996), "Iterative pre-stack depth migration with velocity analysis," *Terrestrial, Atmospheric & Oceanic Sciences* 7(2), pp. 149-158.

van Groenestijn, G.J.A. et al. (2009), "Estimating primaries by sparse inversion and application to near-offset reconstruction," *Geophyhsics* 74(3), pp. A23-A28.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Wang, Y. (2007), "Multiple prediction through inversion: Theoretical advancements and real data application," *Geophysics* 72(2), pp. V33-V39.

Wang, K. et al. (2009), "Simultaneous full-waveform inversion for source wavelet and earth model," SEG Int'l. Expo. & Ann. Meeting, *Expanded Abstracts*, pp. 2537-2541.

Akerberg, P., et al. (2008), "Simultaneous source separation by sparse radon transform," 78th Annual International Meeting, SEG, Expanded Abstracts, pp. 2801-2805.

Bunks, C. et al. (1995), "Multiscale seismic waveform inversion," *Geophysics* 60, pp. 1457-1473.

Dziewonski, A. et al. (1981), "Preliminary Reference Earth Model", *Phys. Earth Planet. Int.* 25(4), pp. 297-356.

Griewank, A. (1992), "Achieving logarithmic growth of temporal and spatial complexity in reverse automatic differentiation," 1 *Optimization Methods and Software*, pp. 35-54.

Griewank, A. et al. (1990), "ADOL-C, a package for the automatic differentiation of algorithms written in C/C++," Preprint MCS-180-1190, Mathematics and Computer Science Division, Argonne National Laboratory, Argonne, Illinois, pp.

Boonyasiriwat, C. et al. (2010), "3D Multisource Full-Waveform Inversion using Dynamic Random Phase Encoding," SEG Denver 2010 Annual Meeting, pp. 1044-1049.

Boonyasiriwat, C. et al. (2010), "3D Multi-source Least-squares Reverse Time Migration," SEG Denver 2010 Annual Meeting, pp. 3120-3124.

Schuster, G.T. et al. (2010), "Theory of Multisource Crosstalk Reduction by Phase-Encoded Statics," SEG Denver Annual Meeting 2010, pp. 3110-3114.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70th Annual Meeting Expanded Abstracts*, pp. 786-789.

Kennett, B.L.N. (1991), "The removal of free surface interactions from three-component seismograms", *Geophys. J. Int.* 104, pp. 153-163.

Krebs, J.R. (2008), "Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lecomte, I. (2008), "Resolution and illumination analyses in PSDM: A ray-based approach," The Leading Edge, pp. 650-663.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Marcinkovich, C. et al. (2003), "On the implementation of perfectly matched layers in a three-dimensional fourth-order velocity-stress finite difference scheme," *J. of Geophysical Research* 108(B5), pp. 2276.

Maharramov, M., U. Albertin, 2007, "Localized image-difference wave-equation tomography," SEG Annual Meeting Expanded Abstracts, San Antonio, 2007, pp. 3009-3013.

Meier, M.A. et al. (2009), "Converted wave resolution," Geophysics, 74(2):doi:10.1190/1.3074303, pp. Q1-Q16.

Mora, P. (1987), "Nonlinear two-dimensional elastic inversion of multi-offset seismic data," Geophysics 52, pp. 1211-1228.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Plessix, R.E. et al. (2004), "Frequency-domain finite-difference amplitude preserving migration," *Geophys. J. Int.* 157, pp. 975-987.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Porter, R.P. (1989), "Generalized holography with application to inverse scattering and inverse source problems," In E. Wolf, editor, Progress in Optics XXVII, Elsevier, pp. 317-397.

Rayleigh, J.W.S. (1899), "On the transmission of light through an atmosphere containing small particles in suspension, and on the origin of the blue of the sky," *Phil. Mag.* 47, pp. 375-384.

Romero, L.A. et al. (2000), Phase encoding of shot records in prestack migration, *Geophysics* 65, pp. 426-436.

Ryden, N. et al. (2006), "Fast simulated annealing inversion of surface waves on pavement using phase-velocity spectra," *Geophysics* 71(4), pp. R49-R58.

Sheriff, R.E. et al. (1982), "Exploration Seismology", pp. 134-135.

Shin, C. et al. (2001), "Waveform inversion using a logarithmic wavefield," Geophysics 49, pp. 592 606.

Sirgue, L. (2004), "Efficient waveform inversion and imaging: A strategy for selecting temporal frequencies," *Geophysics* 69, pp. 231-248.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W., (2007), Reverse time migration with optimal checkpointing, *Geophysics* 72(5), pp. P.SM213-SM221.

Tarantola, A. (1984), "Inversion of seismic reflection data in the acoustic approximation," *Geophysics* 49, pp. 1259-1266.

Tarantola, A. (1988), "Theoretical background for the inversion of seismic waveforms, including elasticity and attenuation," *Pure and Applied Geophysics* 128, pp. 365-399.

Trantham, E.C. (1994), "Controlled-phase acquisition and processing," *SEG Expanded Abstracts* 13, pp. 890-894.

van Manen, D.J. (2005), "Making wave by time reversal," SEG International Exposition and 75th Annual Meeting, *Expanded Abstracts*, pp. 1763-1766.

Weglein, A.B. (2003), "Inverse scattering series and seismic exploration," *Inverse Problems* 19, pp. R27-R83.

Verschuur, D.J. (2009), Target-oriented, least-squares imaging of blended data, 79th Annual Int'l. Meeting, *SEG Expanded Abstracts*, pp. 2889-2893.

Vigh, D. et al. (2008), "3D prestack plane-wave, full-waveform inversion," *Geophysics* 73(5), pp. VE135-VE144.

Wu, R. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

Baumstein, A. et al. (2009), "Scaling of the Objective Function Gradient for Full Wavefield Inversion," SEG Houston 2009 Int'l. Expo. & Annual Meeting, pp. 2243-2247.

Burstedde, C. et al. (2009), "Algorithmic strategies for full waveform inversion: 1D experiments," *Geophysics* 74(6), pp. WCC37-WCC46.

Lee, S. et al. (2010), "Subsurface parameter estimation in full wavefield inversion and reverse time migration," *SEG Denver 2010 Annual Meeting*, pp. 1065-1069.

Malmedy, W. et al. (2009), "Approximating Hessians in unconstrained optimization arising from discretized problems," *Computational Optimization and Applications*, pp. 1-16.

Martin, G.S. et al. (2006), "Marmousi2: An elastic upgrade for Marmousi," *The Leading Edge*, pp. 156-166.

Nocedal, J. et al. (2006), "*Numerical Optimization, Chapt. 7—Large-Scale Unconstrained Optimization*," Springer, New York, $2^{nd}$ Edition, pp. 165-176.

Sheen, D-H. et al. (2006), "Time domain Gauss-Newton seismic waveform inversion in elastic media," *Geophysics J. Int.* 167, pp. 1373-1384.

Tarantola, A. (1986), "A strategy for nonlinear elastic inversion of seismic reflection data," *Geophysics* 51(10), pp. 1893-1903.

Tarantola, A. (2005), "Inverse Problem Theory and Methods for Model Parameter Estimation," *SIAM*, p. 79.

\* cited by examiner

METHODS FOR SUBSURFACE PARAMETER ESTIMATION IN FULL WAVEFIELD INVERSION AND REVERSE-TIME MIGRATION

CROSS-REFERENCE TO RELATED APPLICATION

This application claims the benefit of U.S. Provisional Application No. 61/303,148 filed Feb. 10, 2010, entitled Methods for Subsurface Parameter Estimation in Full Wavefield Inversion and Reverse-Time Migration, which is incorporated by reference, in its entirety, for all purposes.

FIELD OF THE INVENTION

This invention relates generally to the field of geophysical prospecting and, more particularly, to seismic data processing. Specifically, the invention is a method for subsurface parameter estimation in full wave field inversion and reverse-time migration.

BACKGROUND OF THE INVENTION

Full wavefield inversion (FWI) in exploration seismic processing relies on the calculation of the gradient of an objective function with respect to the subsurface model parameters [12]. An objective function E is usually given as an $L_2$ norm as $$E = \frac{1}{2} \int\int\int |p(r_g, r_s; t) - p_b(r_g, r_s; t)|^2 dt dS_g dS_s, \quad (1)$$

where p and $p_b$ are the measured pressure, i.e. seismic amplitude, and the modeled pressure in the background subsurface model at the receiver location $r_g$ for a shot located at $r_s$. In iterative inversion processes, the background medium is typically the medium resulting from the previous inversion cycle. In non-iterative inversion processes or migrations, the background medium is typically derived using conventional seismic processing techniques such as migration velocity analysis. The objective function is integrated over all time t, and the surfaces $S_g$ and $S_s$ that are defined by the spread of the receivers and the shots. We define $K_d(r) = K(r) - K_b(r)$ and $\rho_d(r) = \rho(r) - \rho_b(r)$, where $K(r)$ and $\rho(r)$ are the true bulk modulus and density, and $K_b(r)$ and $\rho_b(r)$ are the bulk modulus and the density of the background model at the subsurface location r. We also define the difference between the measured and the modeled pressure to be $p_d(r_g, r_s; t) = p(r_g, r_s; t) - p_b(r_g, r_s; t)$.

The measured pressure p, satisfies the wave equation $$\rho \nabla \cdot \left(\frac{1}{\rho} \nabla p\right) - \frac{\rho}{K} \ddot{p} = -q(t)\delta(r - r_s), \quad (2)$$

or $$(\rho_b + \rho_d)\nabla \cdot \left(\frac{1}{\rho_b + \rho_d} \nabla (p_b + p_d)\right) - \frac{\rho_b + \rho_d}{K_b + K_d}(\ddot{p}_b + \ddot{p}_d) = -q(t)\delta(r - r_s), \quad (3)$$

where q(t) is the source signature. By expanding the perturbation terms and keeping only the 1st order Born approximation terms, one can derive the Born scattering equation for the pressure $p_d$, $$\rho_b \nabla \cdot \left(\frac{1}{\rho_b} \nabla p_d\right) - \frac{\rho_b}{K_b} \ddot{p}_d = -\left[\frac{\rho_b K_d}{K_b^2} \ddot{p}_b - \rho_b \nabla \cdot \left(\frac{\rho_d}{\rho_b^2} \nabla p_b\right)\right], \quad (4)$$

and so $p_d$ satisfies $$p_d(r_g, r_s; t) = \int \left[\rho_b(r') \frac{K_d(r')}{K_b^2(r')} \ddot{p}_b(r', r_s; t) - \rho_b(r')\nabla \cdot \left(\frac{\rho_d(r')}{\rho_b^2(r')} \nabla p_b(r', r_s; t)\right)\right] * g_b(r_g, r'; t) dV', \quad (5)$$

where V' is the volume spanned by r', and $g_b$ is the Green's function in the background medium.

One can derive the equations for the gradients of $p_b$ using Eq. (5) and by considering the fractional change $\delta p_b$ due to fractional change $\delta K_b$ and $\delta \rho_b$ over an infinitesimal volume dV, $$\frac{\partial p_b}{\partial K_b(r)} = \frac{\rho_b(r)dV}{K_b^2(r)} g_b(r_g, r; t) * \ddot{p}_b(r, r_s; t), \quad (6)$$

and $$\frac{\partial p_b}{\partial \rho_b(r)} = F^{-1}\left\{\frac{dV}{\rho_b(r)} \nabla G_b(r_g, r; f) \cdot \nabla P_b(r, r_s; f)\right\}, \quad (7)$$

where $P_b = F\{x\}$, $P_d = F\{p_d\}$, $G_b = F\{g_b\}$, and F and $F^{-1}$ are the Fourier transform and the inverse Fourier transform operators.

By using Eqs. 6 and 7, and using the reciprocity relationship $\rho_b(r)G_b(r_g,r) = \rho_b(r_g)G_b(r,r_g)$, $$\begin{aligned}\frac{\partial E}{\partial K_b(r)} &= -\int\int\int p_d \frac{\partial p_b}{\partial K_b(r)} dt dS_g dS_s \\ &= -\frac{\rho_b(r)dV}{K_b^2(r)} \int\int\int (i2\pi f)^2 P_b(r, r_s; f) \\ &\quad G_b(r_g, r; f) P_d^*(r_g, r_s; f) df dS_g dS_s \\ &= \frac{\rho_b(r)dV}{K_b^2(r)} \int\int \ddot{p}_b(r, r_s; t) \int \frac{\rho_b(r_g)}{\rho_b(r)} g_b(r, r_g; -t) * \\ &\quad p_d(r_g, r_s; t) dS_g dt dS_s,\end{aligned} \quad (8)$$

and $$\begin{aligned}\frac{\partial E}{\partial \rho_b(r)} &= \int\int\int p_d \frac{\partial p_b}{\partial \rho_b(r)} dt dS_g dS_s \\ &= -\frac{dV}{\rho_b(r)} \int\int\int P_d^*(r_g, r_s; f)\nabla P_b(r, r_s; f) \cdot \\ &\quad \nabla G_b(r_g r; f) df dS_g dS_s \\ &= -\frac{dV}{\rho_b(r)} \int\int \nabla p_b(r, r_s; t) \cdot \\ &\quad \left[\int \nabla \left(g_b(r, r_g; -t) * \frac{\rho_b(r_g)}{\rho_b(r)} p_d(r_g, r_s; t)\right) dS_g\right] dt dS_s.\end{aligned} \quad (9)$$

One can then use Eqs. 8 and 9 to perform full wavefield inversion in an iterative manner.

Reverse-time migration (RTM) is based on techniques similar to gradient computation in FWI, where the forward propagated field is cross-correlated with the time-reversed received field. By doing so, RTM overcomes limitations of ray-based migration techniques such as Kirchhoff migration. In RTM, the migrated image field M at subsurface location r is given as $$M(r) = \iint p_b(r, r_s; t) \int g_b(r, r_g; -t) * p(r_g, r_s; t) dS_g dt dS_s, \quad (10)$$

which is very similar to the gradient equation 8 of FWI.

While Eqs. 8 and 9 provide the framework for inverting data into subsurface models, the convergence of the inversion process often is very slow. Also, RTM using Eq. 10 suffers weak amplitude in the deep section due to spreading of the wavefield. Many attempts have been made to improve the convergence of FWI or improve the amplitude of the reverse-time migration by using the Hessian of the objective function [9], i.e., a second derivative of the objective function. Computation of the Hessian, however, is not only prohibitively expensive in computational resources, but it requires prohibitively large storage space for a realistic 3-D inversion problem. Furthermore, FWI using the full Hessian matrix may result in suboptimal inversion [2].

One may be able to perform more stable inversion by lumping non-diagonal terms of the Hessian into the diagonal terms [2]. These, however, still require computation of the full Hessian matrix or at least a few off-diagonal terms of the Hessian matrix, which can be costly computations. While one may choose to use the diagonal of the Hessian only [11], this is valid only in the high frequency asymptotic regime with infinite aperture [1, 7].

Plessix and Mulder tried to overcome these difficulties by first computing an approximate diagonal Hessian, then by scaling these by $z^\alpha v_p^\beta$, where z is the depth and $v_p$ is the compressional wave velocity [7]. From numerical experiment, they have determined that the best scaling parameter is $z^{0.5} v_p^{0.5}$. This approach, however, does not provide quantitative inversion of the subsurface medium parameters with correct units, since only approximate scaling has been applied. Furthermore, this approach was applied to RTM where only variations in compressional wave velocity is considered, and so may not be applicable to FWI where other elastic parameters such as density and shear wave velocity vary in space.

SUMMARY OF THE INVENTION

In one embodiment, the invention is a method for determining a model of a physical property in a subsurface region from inversion of seismic data, acquired from a seismic survey of the subsurface region, or from reverse time migration of seismic images from the seismic data, said method comprising determining a seismic resolution volume for the physical property and using it as a multiplicative scale factor in computations performed on a computer to either (a) convert a gradient of data misfit in an inversion, or (b) compensate reverse-time migrated seismic images, to obtain the model of the physical property or an update to an assumed model.

In some embodiments of the inventive method, the gradient of data misfit or the reverse time migrated seismic images are multiplied by additional scale factors besides seismic resolution volume, wherein the additional scale factors include a source illumination factor, a receiver illumination factor, and a background medium properties factor. This results in a model of the physical property or an update to an assumed model having correct units.

It will be obvious to those who work in the technical field that in any practical application of the invention, inversion or migration of seismic data must be performed on a computer specifically programmed to carry out that operation.

BRIEF DESCRIPTION OF THE DRAWINGS

The present invention and its advantages will be better understood by referring to the following detailed description and the attached drawings in which:

FIG. 2 shows the gradient of the objective function with respect to the bulk modulus in Pa m$^4$ s, computed using Eq. 8;

FIG. 3 shows the bulk modulus update $\langle K_d(r) \rangle$ in Pa computed using Eq. 18 and the gradient in FIG. 2;

FIG. 4 shows the bulk modulus update $\langle K_d(r) \rangle$ in Pa computed using Eq. 24 and the gradient in FIG. 2;

FIG. 5 shows the gradient of the objective function with respect to the density in Pa$^2$ m$^7$ s/kg, computed using Eq. 9;

FIG. 6 shows the density update $\langle \rho_d(r) \rangle$ in kg/m$^3$ computed using Eq. 28 and the gradient in FIG. 5; and FIG. 7 shows the density update $\langle \rho_d(r) \rangle$ in kg/m$^3$ computed using Eq. 34 and the gradient in FIG. 5.

Figure 1:
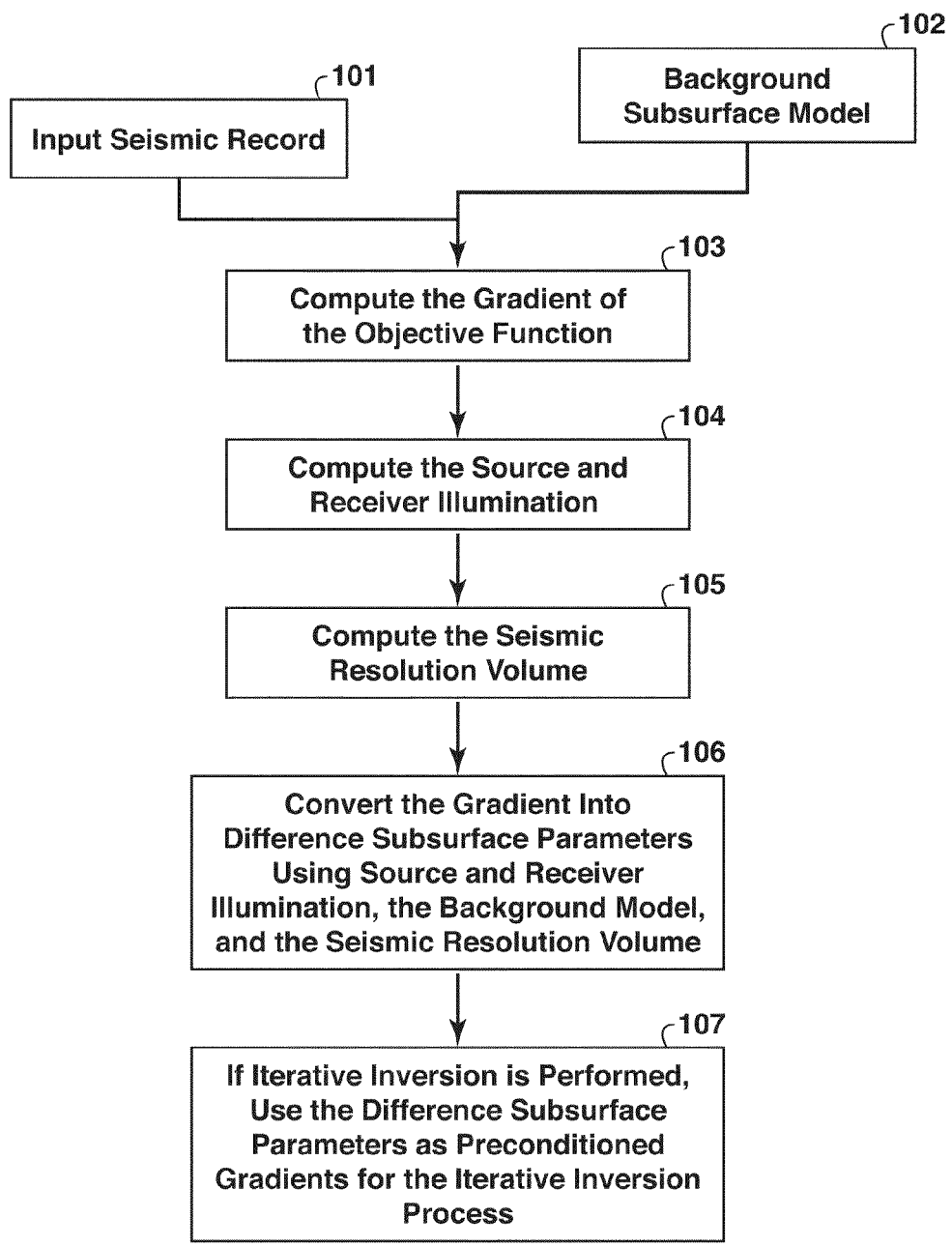
FIG. 1 is a flowchart showing basic steps in one embodiment of the present inventive method.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

We derive inversion equations for $K_d$ and $\rho_d$ in the present invention using Eqs. 8 and 9. This is done by first taking advantage of the fact that $p_d$ in Eqs. 8 and 9 can also be expanded using the Born approximation in Eq. 5. Neglecting the crosstalk components between $K_d$ and $\rho_d$, Eqs. 8 and 9 can then be approximated as $$\frac{\partial E}{\partial K_b(r)} \approx \qquad (11)$$
$$-\frac{\rho_b(r)dV}{K_b^2(r)} \iiint \int \frac{\rho_b(r')K_d(r')}{K_b^2(r')} [g_b(r_g, r'; t) * \tilde{p}_b(r', r_s; t)] \times [g_b(r_g, r; t) * \tilde{p}_b(r, r_s; t)] dt dS_g dS_s dV',$$

and $$\frac{\partial E}{\partial \rho_b(r)} \approx \frac{dV}{\rho_b(r)} \iiint \int \frac{\rho_d(r')}{\rho_b(r')} [\nabla' P_b^*(r', r_s; f) \cdot \nabla' G_b^*(r_g, r'; f)] \times \qquad (12)$$
$$[\nabla P_b(r, r_s; f) \cdot \nabla G_b(r_g, r; f)] dt dS_g dS_s dV'.$$

By changing the orders of the integral, Eq. 11 can be rewritten in the frequency domain as $$\frac{\partial E}{\partial K_b(r)} \approx \frac{\rho_b(r)dV}{K_b^2(r)} \iint (2\pi f)^4 \frac{\rho_b(r')dV}{K_b^2(r')} \frac{K_d(r')}{K_b^2(r')} \times \qquad (13)$$

-continued $$\left\{ \int \frac{\rho_b(r_g)}{\rho_b(r)} G_b(r, r_g; f) G_b^*(r_g, r'; f) dS_g \right\}$$

$$\left\{ \int P_b(r, r_s; f) P_b^*(r', r_s; f) dS_s \right\} dV' df.$$

The first integral term $$\int \frac{\rho_b(r_g)}{\rho_b(r)} G_b(r, r_g; f) G_b^*(r_g, r'; f) dS_g \quad (14)$$

in Eq. 13 is the approximation to the time reversal backpropagation for a field generated by an impulse source at r', measured over the surface $S_g$, and then backpropagated to r (See, e.g., Refs. [8, 3]). The wavefield due to this term propagates back towards the impulse source location at r', and behaves similar to the spatial delta function $\delta(r-r')$ when t=0, if the integral surface $S_g$ embraces the point r'. This wavefield is correlated with the wavefield due to the second term, $\int P_b(r,r_s; f) P_b^*(r',r_s; f) dS_s$, to form the gradient near r=r'. The correlation of the first and the second term then decays rapidly near r=r'. The present invention recognizes that the zone in which the amplitude of the correlation term is not negligible is determined by the seismic resolution of the survey. In the present invention, we make an approximation that $$\int (2\pi f)^4 \left\{ \int \frac{\rho_b(r_g)}{\rho_b(r)} G_b(r, r_g; f) G_b^*(r_g, r'; f) dS_g \right\} \quad (15)$$

$$\left\{ \int P_b(r, r_s; f) P_b^*(r', r_s; f) dS_s \right\} df \approx I_K(r) V_K(r) \delta(r - r'),$$

where $$I_K(r) = \int (2\pi f)^4 \left\{ \int \frac{\rho_b(r_g)}{\rho_b(r)} G_b(r, r_g; f) G_b^*(r_g, r; f) dS_g \right\} \times \quad (16)$$

$$\left\{ \int P_b(r, r_s; f) P_b^*(r, r_s; f) dS_s \right\} df,$$

and $V_K(r)$ is the seismic resolution at the subsurface location r. Equation 15 is equivalent to the mass lumping of the Gauss-Newton Hessian matrix by assuming that the non-diagonal components are equal to the diagonal components when the non-diagonal components are within the seismic resolution volume of the diagonal component, and those outside the resolution volume zero. In other words, Eq. 15 is equivalent to implicitly counting the number of non-diagonal components $N_i$ of the Gauss-Newton Hessian matrix in each i-th row that are significant in amplitude by using the seismic resolution volume of the survey, then multiplying the diagonal component of the i-th row by $N_i$.

Seismic resolution volume may be thought of as the minimal volume at r that a seismic imaging system can resolve under given seismic data acquisition parameters. Two small targets that are within one seismic resolution volume of each other are usually not resolved and appear as one target in the seismic imaging system. The resolution volumes for different medium parameters are different due to the difference in the radiation pattern. For example, the targets due to a bulk modulus perturbation yield a monopole radiation pattern, while those due to a density perturbation yield a dipole radiation pattern. Seismic resolution volume $V_K(r)$ for bulk modulus can be computed, for example, using a relatively inexpensive ray approximation [6, 4]. Persons who work in the technical field may know other ways to estimate the resolution volume. For example, one may be able to empirically estimate the resolution volume by distributing point targets in the background medium, and by investigating spread of the targets in the seismic image. If the background medium contains discontinuity in velocity due to iterative nature of the inversion, the background medium may need to be smoothed for ray tracing. One may also make a simplifying assumption that the wavenumber coverage is uniform. The seismic resolution volume in this case is a sphere with radius $\sigma \approx (5/18\pi)^{0.5} v_p(r)/f_p$, where $f_p$ is the peak frequency [6]. One may also employ an approximation, $\sigma \approx v_p(r) T/4 = v_p(r)/4B$, where T and B are the effective time duration and the effective bandwidth of the source waveform, following the radar resolution equation [5].

Equation 11 can then be simplified using Eq. 15 as $$\frac{\partial E}{\partial K_b(r)} \approx -\frac{\rho_b^2(r) V}{K_b^4(r)} \langle K_d(r) \rangle I_K(r) V_K(r), \quad (17)$$

and so $$\langle K_d(r) \rangle \approx -\frac{K_b^4(r)}{\rho_b^2(r) dV} \frac{1}{I_K(r) V_K(r)} \frac{\partial E}{\partial K_b(r)}, \quad (18)$$

where $\langle K_d(r) \rangle$ is the spatial average of $K_d$ over the seismic resolution at spatial location r.

Equation 16 can be further simplified if we use free-space Green's function $$G(r_g, r; f) = \frac{1}{4\pi |r - r_g|} e^{ik|r-r_g|}, \quad (19)$$

and assume that $S_g$ subtends over half the solid angle. Equation 16 then simplifies to $$I_K(r) \approx I_{K,s}(r) I_{K,g}(r), \quad (20)$$

where $$I_{K,s}(r) = \int |\dot{p}_b(r, r_s; t)|^2 dt, \quad (21)$$

and $$I_{K,g}(r) = \int \frac{\rho_b(r_g)}{\rho_b(r)} G_b(r, r_g; f) G_b^*(r_g, r; f) dS_g \approx \frac{1}{8\pi} \frac{\rho_b(r_g)}{\rho_b(r)}. \quad (22)$$

The term $I_{K,s}(r)$ may be recognized as the source illumination in the background model, and $I_{K,g}(r)$ can be understood to be the receiver illumination. One may also be able to vary the solid angle of integral at each subsurface location r following the survey geometry. Equation 11 then becomes $$\frac{\partial E}{\partial K_b(r)} \approx -\frac{\rho_b^2(r) dV}{K_b^4(r)} \langle K_d(r) \rangle I_{K,s}(r) I_{K,g}(r) V_K(r) \quad (23)$$

and $$\langle K_d(r) \rangle \approx -\frac{K_b^4(r)}{\rho_b^2(r) dV} \frac{1}{I_{K,s}(r) I_{K,g}(r) V_K(r)} \frac{\partial E}{\partial K_b(r)}. \quad (24)$$

Equations 18 and 24 show that one can convert the gradient $\partial E/\partial K_b(r)$ into a medium parameter $\langle K_d(r) \rangle$ by scaling the gradient by the source and receiver illumination, resolution volume, and the background medium properties. If the inversion process is not iterative, one should be able to use Eq. 24 for parameter inversion. If the inversion process is iterative, one can use $\langle K_d(r) \rangle$ in Eq. 24 as a preconditioned gradient for optimization techniques such as steepest descent, conjugate gradient (CG), or Newton CG method. It is important to note that Eqs. (18) and (24) yield bulk modulus with the correct units, i.e. are dimensionally correct, because all terms have been taken into account, and none have been neglected to simplify the computation as is the case with some published approaches. The published approaches that neglect one or more of the terms source illumination, receiver illumination, background medium properties and seismic resolution volume, will not result in the correct units, and therefore will need some sort of ad hoc fix up before they can be used for iterative or non-iterative inversion.

For density gradient, we make an assumption similar to that in Eq. 15, $$\iiint [\nabla' P_b^*(r',r_s;f) \cdot \nabla' G_b^*(r_g,r';f)] \times [\nabla P_b(r,r_s;f) \cdot \nabla G_b(r_g,r;f)] dS_g dS_s df \approx I_\rho(r) V_\rho(r) \delta(r-r'), \quad (25)$$

where $$I_\rho(r) = \iiint |\nabla P_b(r,r_s;f) \cdot \nabla G_b(r_g,r;f)|^2 dS_g dS_s df, \quad (26)$$

and $V_\rho(r)$ is the seismic resolution for density $\rho$ at subsurface location $r$. The resolution volume $V_\rho(r)$ differs from $V_K(r)$, since the wavenumbers are missing when the incident and the scattered field are nearly orthogonal to each other. This is due to the dipole radiation pattern of the density perturbation, as discussed previously. As was done for $V_K(r)$, one can employ ray tracing to compute the resolution volume $V_\rho(r)$ while accounting for these missing near-orthogonal wavenumbers. Alternatively, one may be able assume $V_K(r) \approx V_\rho(r)$ by neglecting the difference in the wavenumber coverage.

The gradient equation 12 can then be rewritten as $$\frac{\partial E}{\partial \rho_b(r)} \approx -\frac{dV}{\rho_b^2(r)} \langle \rho_d(r) \rangle I_\rho(r) V_\rho(r), \quad (27)$$

and so $$\langle \rho_d(r) \rangle \approx -\frac{\rho_b^2(r)}{dV} \frac{1}{I_\rho(r) V_\rho(r)} \frac{\partial E}{\partial \rho_b(r)}, \quad (28)$$

where $\langle \rho_d(r) \rangle$ is the spatial average of $\rho_d(r)$ over the seismic resolution volume $V_\rho(r)$.

We can further simplify Eq. 25 by using the vector identity $(a \cdot b)(c \cdot d) = (a \cdot d)(b \cdot c) + (a \times c) \cdot (b \times d)$ to obtain $$[\nabla' P_b^*(r',r_s;f) \cdot \nabla' G_b^*(r_g,r';f)][\nabla P_b(r,r_s;f) \cdot \nabla G_b(r_g,r;f)] = [\nabla' P_b^*(r',r_s;f) \cdot \nabla P_b(r,r_s;f)][\nabla' G_b^*(r_g,r';f) \cdot \nabla G_b(r_g,r;f)] + [\nabla' P_b^*(r',r_s;f) \times \nabla G_b(r_g,r;f)] \cdot [\nabla' G_b^*(r_g,r';f) \times \nabla P_b(r,r_s;f)]. \quad (29)$$

The second term in the right-hand side of Eq. 29 is the correction term for the dipole radiation pattern of the scattered field, and so it reaches a maximum when $\nabla P_b$ and $\nabla G_b$ are orthogonal to each other. Neglecting this correction term, $$[\nabla' P_b^*(r',r_s;f) \cdot \nabla' G_b^*(r_g,r';f)][\nabla P_b(r,r_s;f) \cdot \nabla G_b(r_g,r;f)] \approx [\nabla' P_b^*(r',r_s;f) \cdot \nabla P_b(r,r_s;f)][\nabla' G_b^*(r_g,r';f) \cdot \nabla G_b(r_g,r;f)]. \quad (30)$$

Then Eq. 12 can be approximated as $$\frac{\partial E}{\partial \rho_b(r)} \approx \quad (31)$$

$$-\frac{dV}{\rho_b(r)} \int\int \frac{\rho_b(r')}{\rho_b(r')} \left\{ \int [\nabla' G_b^*(r_g, r'; f) \cdot \nabla G_b(r_g, r; f)] dS_g \right\} \times \left\{ \int [\nabla' P_b^*(r', r_s; f) \cdot \nabla P_b(r, r_s; f)] dS_s \right\} df dV'$$

We can approximate the integral over $S_g$ in Eq. 26 by using free-space Green's function, $$\int \nabla G_b^*(r_g, r; f) \cdot \nabla G_b(r_g, r; f) dS_g \approx \quad (32)$$

$$\frac{\rho_b(r_g)}{\rho_b(r)} \int \nabla G_b^*(r_g, r; f) \cdot \nabla G_b(r, r_g; f) dS_g \approx \frac{\rho_b(r_g)}{\rho_b(r)} \frac{(2\pi f)^2}{8\pi v_p^2(r)},$$

The integral was performed over half the solid angle under the assumption that $\nabla(\rho_b(r_g)/\rho_b(r)) \approx 0$, and $\rho_b(r_g)$ is constant along $S_g$.

The gradient equation above can then be rewritten as $$\frac{\partial E}{\partial \rho_b(r)} \approx -\frac{dV}{\rho_b^2(r)} \langle \rho_d(r) \rangle I_{\rho,s}(r) I_{\rho,g}(r) V_\rho(r) \quad (33)$$

and so $$\langle \rho_d(r) \rangle \approx -\frac{\rho_b^2(r)}{dV} \frac{1}{I_{\rho,s}(r) I_{\rho,g}(r) V_\rho(r)} \frac{\partial E}{\partial \rho_b(r)}, \quad (34)$$

where $$I_{\rho,s}(r) = \int |\nabla \dot{p}(r, r_s; t)|^2 dt dS_s, \quad (35)$$

and $$I_{\rho,s}(r) = \frac{\rho_b(r_g)}{\rho_b(r)} \frac{1}{8\pi v_p^2(r)}. \quad (36)$$

As was the case with $\langle K_d(r) \rangle$, Eqs. 28 or 34 can be used as an inversion formula for non-iterative inversion, or as a preconditioned gradient equation for iterative inversion. It is important to note that these equations yield density with the correct units, i.e. are dimensionally correct, because all terms have been taken into account, and none have been neglected to simplify the computation as is the case with some published approaches. The same is true for Eqs. 18 and 24 for bulk modulus. The published approaches that neglect one or more of the terms source illumination, receiver illumination, background medium properties and seismic resolution volume, will not result in the correct units, and therefore will need some sort of ad hoc fix up before they can be used for iterative or non-iterative inversion.

Since the first iteration of FWI is similar to RTM, the method provided here can be applied to analyze the amplitude term in RTM with little modification. Seismic migration including RTM is typically used to image the structure of the subsurface, and so amplitude information in the migrated image is often discarded. We show that the RTM amplitude, when properly scaled using the method provided here, represents the difference between the true compressional wave velocity of the subsurface and the velocity of the background model.

We note that the RTM equation 10 is missing the double derivative of the incident field in Eq. 8. This double derivative represents that high frequency components scatter more efficiently than the low frequency components in the classical Rayleigh scattering regime (Refs. [10, 13]). Therefore, we can consider Eq. 10 as the gradient computation operation in Eq. 8, partially neglecting the frequency dependence of the scattered field, $$\frac{\partial E}{\partial K_b(r)} \approx -\frac{\rho_b dV(i2\pi f_c)^2}{K_b^2(r)} \quad (37)$$

$$\int\int\int P_b(r, r_s; f) G_b(r, r_g; f) P^*(r_g, r_s; f) df dS_g dS_s \approx$$

$$-\frac{\rho_b dV(i2\pi f_c)^2}{K_b^2(r)} M(r),$$

where $f_c$ is the center frequency of the source waveform. Frequency dependence is partially neglected because, while the frequency dependence in the forward field $p_b$ has been neglected, the frequency dependence implicit in the received field $p_s$ cannot be neglected. Spatial variation of density is usually not considered in RTM, and so $\rho_b$ is assumed to be constant in Eq. 37.

One can now apply the same approximation used to derive Eqs. 17 and 23 to Eq. 10, $$\frac{\partial E}{\partial K_b(r)} \approx -\frac{\rho_b^2 I_{K,g}(r) V_K(r) dV \langle K_d(r) \rangle (i2\pi f_c)^2}{K_b^4(r)} \quad (38)$$

$$\int\int (i2\pi f)^2 P_b(r, r_s; f) P_b^*(r, r_s; f) df dS_s,$$

which, together with Eq. 37, yields $$\langle K_d(r) \rangle \approx \frac{K_b^4(r)}{\rho_b I_{K,g}(r) V_K(r)} \frac{M(r)}{\int\int |p_b(r, r_s; t)|^2 dt dS_s}. \quad (39)$$

Equation 39 enables quantitative analysis of the amplitude in the reverse-time migrated image. More specifically, it enables inversion of the amplitude into the difference bulk modulus of the subsurface.

FIG. 1 is a flowchart showing basic steps in one embodiment of the present inventive method. In step 103, the gradient of an objective function is computed using an input seismic record (101) and information about the background subsurface medium (102). At step 104, the source and receiver illumination in the background model is computed. At step 105, the seismic resolution volume is computed using the velocities of the background model. At step 106, the gradient from step 103 is converted into the difference subsurface model parameters using the source and receiver illuminations from step 104, seismic resolution volume from step 105, and the background subsurface model (102). If an iterative inversion process is to be performed, at step 107 the difference subsurface model parameters from step 106 are used as preconditioned gradients for the iterative inversion process.

EXAMPLES

We consider the case of a 30 m×30 m×30 m "perfect" Born scatterer in a homogeneous medium with $K_b$=9 MPa and $\rho_b$=1000 kg/m$^3$. The target is centered at (x,y,z)=(0,0,250 m), where x and y are the two horizontal coordinates and z is the depth. The target may be seen in FIGS. 2-7 as a 3×3 array of small squares located in the center of each diagram. We assume co-located sources and receivers in the −500 m≦x≦500 m and −500 m≦y≦500 m interval with the 10-m spacing in both x and y directions. We assume that the source wavelet has a uniform amplitude of 1 Pa/Hz at 1 m in the 1 to 51 Hz frequency band.

Figure 2:
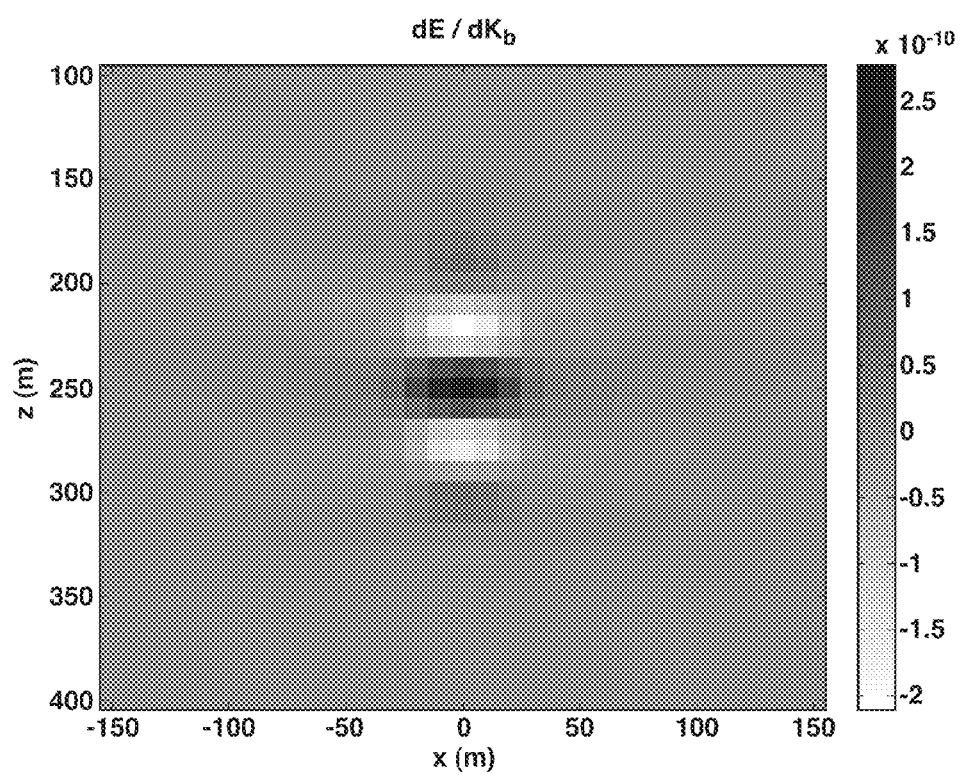
FIGS. 2-5 pertain to a first example application of the present invention, where

In the first example, we assume that the target has the bulk modulus perturbation given as $K_d$=900 kPa. FIG. 2 shows the gradient $\partial E/\partial K_b(r)$ along the y=0 plane using Eq. 8. The scattered field $p_d$ in Eq. 8 has been computed using Eq. 5. The gradient in FIG. 2 has units of Pa m$^4$ s, and so cannot be directly related to $K_d$. As described in the "Background" section above, this is a difficulty encountered in some of the published attempts to compute a model update from the gradient of the objective function.

Figure 3:
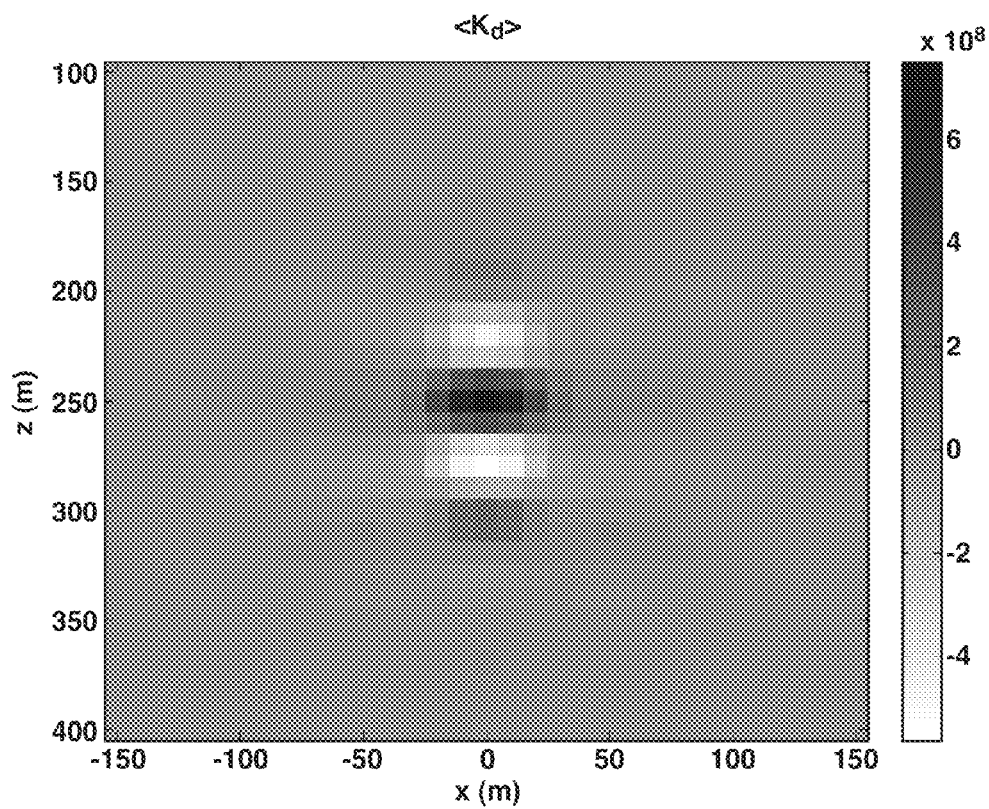
Figure 4:
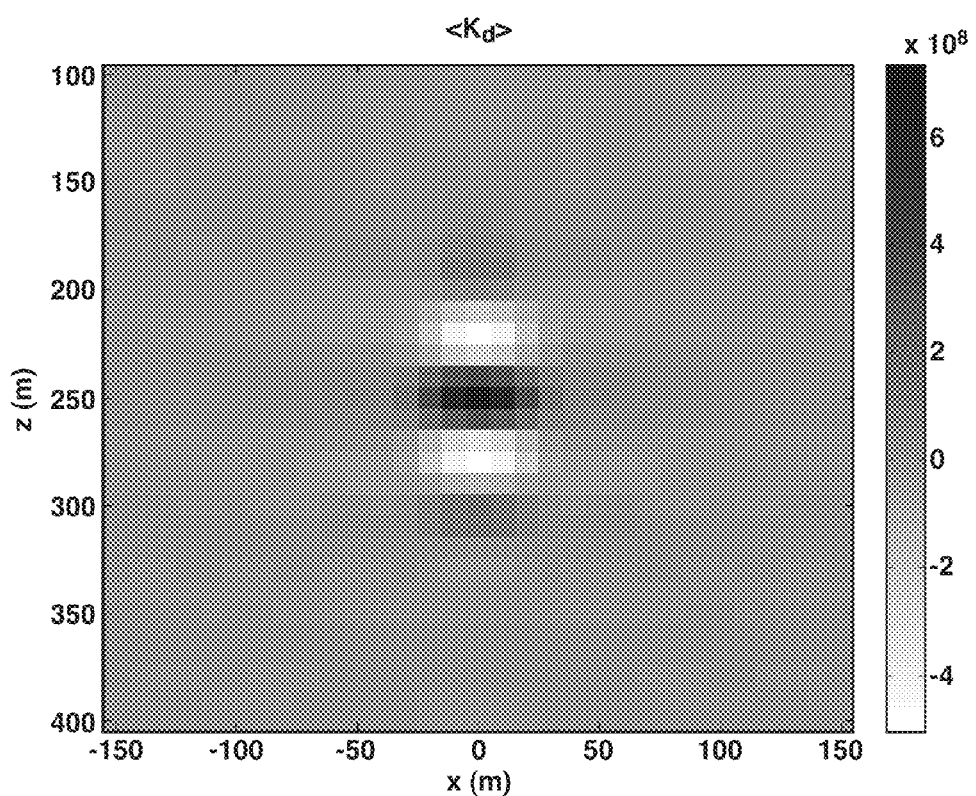

FIG. 3 shows $\langle K_d(r) \rangle$ using Eq. 18 of the present invention. It has been assumed that the seismic resolution volume $V_K(r)$ is a sphere with radius $\sigma=v_p(r)/4B=15$ m. One can see that FIG. 3 is the smeared image of the target, since $\langle K_d(r) \rangle$ is the averaged property over the seismic resolution volume. FIG. 4 is $\langle K_d(r) \rangle$ when the less rigorous Eq. 24 is employed. One can see that $\langle K_d(r) \rangle$ in FIGS. 3 and 4 are in good agreement with each other. The value of $\langle K_d(r) \rangle$ at the center of the target in FIG. 3 is 752 kPa, and that in FIG. 4 is 735 kPa, both of which are within 20% of the true value of 900 kPa.

Figure 5:
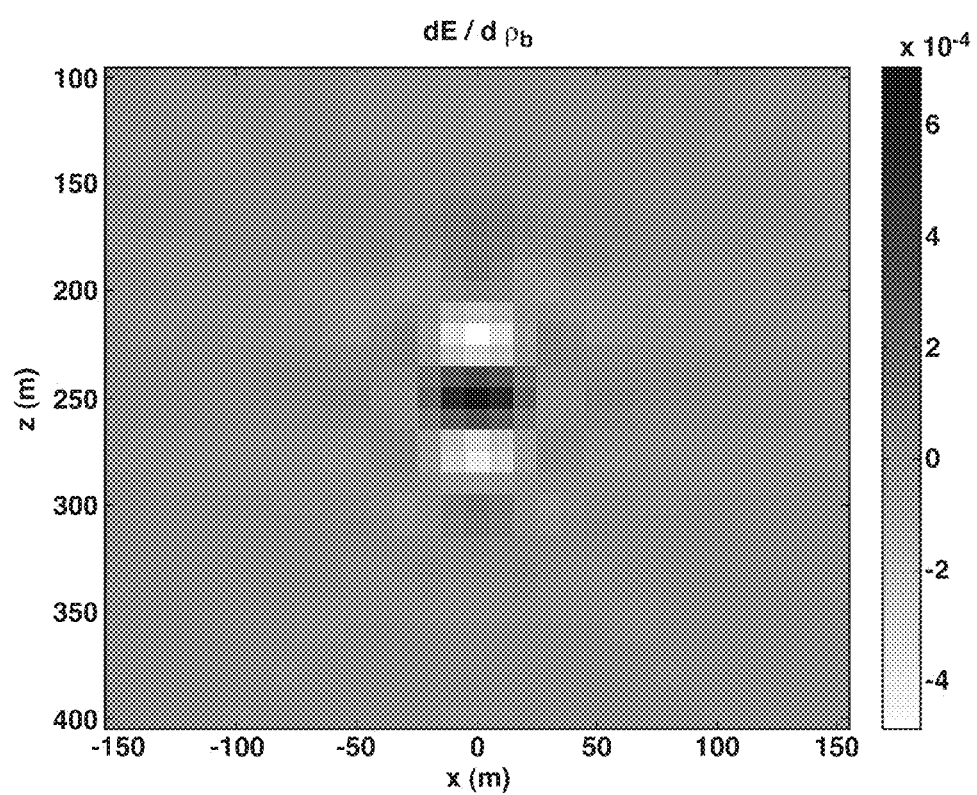

The second example is the case where the target has a density perturbation of $\rho_d$=100 kg/m$^3$. FIG. 5 shows the gradient $\partial E/\partial \rho_b(r)$ along the y=0 plane using Eq. 9. The scattered field in Eq. 9 has been computed using Eq. 5. The gradient in FIG. 5 has units of Pa$^2$ m$^7$ s/kg. As with the first example, the different units prevent the gradient from being directly related to a density update, again illustrating the problem encountered in published methods.

Figure 6:
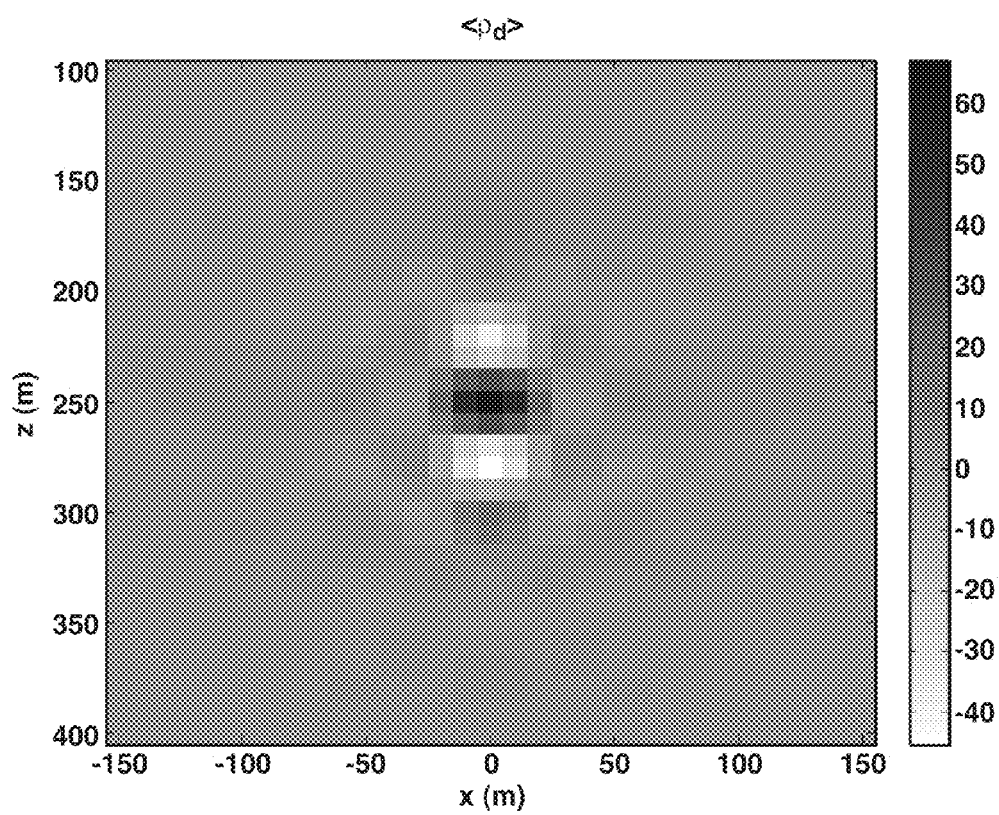
FIGS. 6 and 7 pertain to a second example application of the present invention, where
Figure 7:
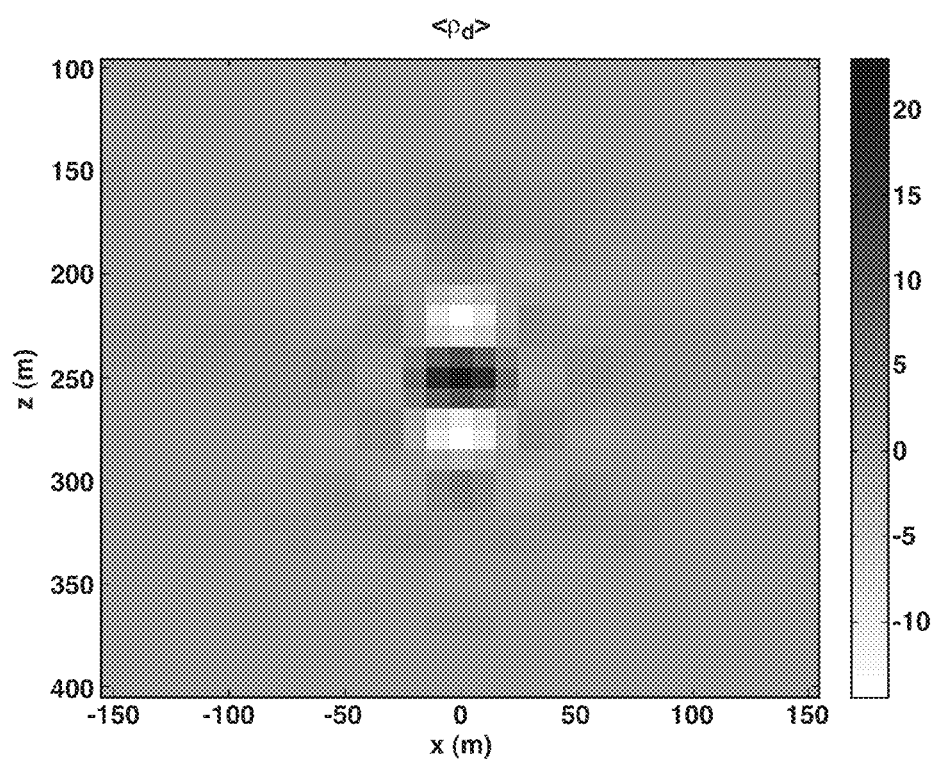

FIG. 6 shows $\langle \rho_d(r) \rangle$ using Eq. 28. The seismic resolution volume $V_\rho(r)$ has been assumed to be identical to $V_K(r)$. FIG. 7 is $\langle \rho_d(r) \rangle$ when Eq. 34 is employed. Estimation of $\langle \rho_d(r) \rangle$ using Eq. 34 results in less accurate inversion than that using Eq. 28 due to the neglected dipole illumination term in Eq. 31.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in practical applications of the invention, at least some of the steps in the present inventive method are performed on or with the aid of a computer, i.e. the invention is computer implemented.

REFERENCES

[1] G. Beylkin, "Imaging of discontinuities in the inverse scattering problem by inversion of a causal generalized Radon transform," *J. Math. Phys.* 26, 99-108 (1985).
[2] G. Chavent and R.-E. Plessix, "An optimal true-amplitude least-squares prestack depth-migration operator," *Geophysics* 64(2), 508-515 (1999).
[3] D. R. Jackson and D. R. Dowling, "Phase conjugation in underwater acoustics," *J. Acoust. Soc. Am.* 89(1), 171-181 (1991).

[4] I. Lecomte, "Resolution and illumination analyses in PSDM: A ray-based approach," *The Leading Edge*, pages 650-663 (May 2008).

[5] N. Levanon, *Radar Principles*, chapter 1, pages 1-18, John Wiley & Sons, New York (1988).

[6] M. A. Meier and P. J. Lee, "Converted wave resolution," *Geophysics* 74(2), Q1-Q16 (2009).

[7] R. E. Plessix and W. A. Mulder, "Frequency-domain finite-difference amplitude-preserving migration," *Geophys. J. Int.* 157, 975-987 (2004).

[8] R. P. Porter, "Generalized holography with application to inverse scattering and inverse source problems," *Progress in Optics XXVII*, E. Wolf, editor, pages 317-397, Elsevier (1989).

[9] R. G. Pratt, C. Shin, and G. J. Hicks, "Gauss-Newton and full Newton methods in frequency-space seismic waveform inversion," *Geophys. J. Int.* 133, 341-362 (1998).

[10] J. W. S. Rayleigh, "On the transmission of light through an atmosphere containing small particles in suspension, and on the origin of the blue of the sky," *Phil. Mag.* 47, 375-384 (1899).

[11] C. Shin, S. Jang, and D.-J. Min, "Waveform inversion using a logarithmic wavefield," *Geophysics* 49, 592-606 (2001).

[12] A. Tarantola, "Inversion of seismic reflection data in the acoustic approximation," *Geophysics* 49, 1259-1266 (1984).

[13] R. J. Urick, *Principles of Underwater Sound*, chapter 9, pages 291-327, McGraw-Hill, New York, 3rd edition (1983).

The invention claimed is:

1. A method for determining a model of a physical property in a subsurface region from inversion of seismic data, acquired from a seismic survey of the subsurface region, or from reverse time migration of seismic images from the seismic data, said method comprising determining a seismic resolution volume for the physical property and using it as a multiplicative scale factor
in computations performed on a computer to either
  convert a gradient of data misfit in an inversion, or
  compensate reverse-time migrated seismic images,
to obtain the model of the physical property or an update to an assumed model.

2. The method of claim 1, further comprising multiplying the gradient of data misfit or the reverse time migrated seismic images by additional scale factors including a source illumination factor, a receiver illumination factor, and a background medium properties factor to then obtain the model of the physical property or an update to an assumed model.

3. The method of claim 1, wherein the seismic resolution volume is determined by ray tracing using velocity of a background medium model and using an assumed function of frequency for a seismic wavelet.

4. The method of claim 2, wherein the model is determined from inversion of seismic data, said method further comprising:
  assuming an initial model of the subsurface region specifying a model parameter at discrete cell locations in the subsurface region;
  forming a mathematical objective function to measure misfit between measured seismic data and model-calculated seismic data;
  selecting a mathematical relationship that gives an adjustment, i.e. update, to the initial model that would reduce the misfit, said mathematical relationship relating said adjustment to a scaled gradient of the objective function, said gradient being with respect to said model parameter, the scaling comprising the four scale factors, i.e.
    the seismic resolution volume factor,
    the source illumination factor,
    the receiver illumination factor, and
    the background medium properties factor,
  all of which appear in the mathematical relationship as multiplicative factors that scale the gradient of the objective function to yield the adjustment to the model parameter; and
  using a computer to compute the adjustment from the mathematical relationship, and then updating the initial model with the computed adjustment.

5. The method of claim 4, wherein the physical property, i.e. the model parameter, is either bulk modulus or density, or a combination of bulk modulus and density.

6. The method of claim 4, wherein the mathematical relationship depends upon the physical property.

7. The method of claim 4, wherein the background medium properties factor comprises bulk modulus raised to the fourth power divided by density squared when the physical property is bulk modulus, and comprises density squared when the physical property is density.

8. The method of claim 4, wherein the receiver illumination factor when the physical property is bulk modulus is approximated by $(1/8\pi)(\rho_b(r_g)/\rho_b(r))$, where $\rho_b(r)$ is background density at location r and $r_g$ is the receiver's location; and the receiver illumination factor when the physical property is density, $I_{\rho,g}(r)$, is approximated by:

$$I_{\rho,g}(r) = \frac{\rho_b(r_g)}{\rho_b(r)} \frac{1}{8\pi v_p^2(r)}.$$

where $v_p(r)$ is velocity at location r.

9. The method of claim 4, further comprising repeating the method for at least one iteration, where in the initial model is replaced by the updated model from the previous iteration.

10. The method of claim 9, wherein the objective function's functional form and the mathematical relationship's functional form are unchanged from one iteration to a next iteration.

11. The method of claim 4, wherein the adjustment to the initial model is computed by minimizing the objective function using the objective function's Hessian resulting in an Hessian matrix, wherein off-diagonal elements of the Hessian matrix are ignored when outside of a seismic resolution volume.

12. The method of claim 11, wherein off-diagonal elements of the Hessian matrix within a seismic resolution volume are assumed to be equal to a corresponding diagonal element, resulting in computing only diagonal elements.

13. The method of claim 2, wherein the physical property is bulk modulus and the receiver illumination factor is approximated by an integral of a Green's function in free space over a surface defined by the survey's receiver spread.

14. The method of claim 4, wherein the physical property is density and the receiver illumination factor is approximated by an integral of a gradient of a Green's function in free space over a surface defined by the survey's receiver spread.

15. The method of claim 1, wherein the seismic resolution volume is approximated as a sphere based on an assumption of uniform wavenumber coverage.

16. The method of claim 4, further comprising using the updated model to precondition the gradient in an iterative optimization technique.

17. The method of claim 2, wherein the model is determined from reverse time migration of seismic images from the seismic data.

18. The method of claim 17, wherein the physical property is bulk modulus.

19. The method of claim 17, wherein the background medium properties factor comprises bulk modulus squared divided by density.

20. The method of claim 17, wherein the receiver illumination factor is approximated by $(1/8\pi)(\rho_b(r_g)/\rho_b(r))$, where $\rho_b(r)$ is background density at location r and $r_g$ is the receiver's location.

21. The method of claim 17, wherein the migrated images seismic amplitudes are converted into difference bulk modulus or difference compressional wave velocity.

* * * * *